US012066168B2

(12) United States Patent
Wu et al.

(10) Patent No.: US 12,066,168 B2
(45) Date of Patent: Aug. 20, 2024

(54) FILAMENT LAMP

(71) Applicant: Xiamen Topstar Lighting Co., Ltd., Xiamen (CN)

(72) Inventors: Yongjie Wu, Xiamen (CN); Wenda Wen, Xiamen (CN); Jinyun Lin, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 18/506,378

(22) Filed: Nov. 10, 2023

(65) Prior Publication Data

US 2024/0077190 A1 Mar. 7, 2024

(51) Int. Cl.
*F21V 19/00* (2006.01)
*F21K 9/23* (2016.01)
(Continued)

(52) U.S. Cl.
CPC ...... *F21V 19/0025* (2013.01); *F21V 19/0045* (2013.01); *F21V 23/005* (2013.01);
(Continued)

(58) Field of Classification Search
CPC . F21K 9/23; F21K 9/232; F21K 9/233; F21K 9/235; F21K 9/237; F21K 9/238; F21V 23/04; F21V 2119/006; F21V 19/0065; F21V 19/007; F21V 19/0055; F21V 17/16; F21V 17/164; F21V 19/004; H01R 33/9555
See application file for complete search history.

(56) References Cited

U.S. PATENT DOCUMENTS 9,657,928 B1 * 5/2017 Jacobson ............... H05B 47/19
2011/0095687 A1 * 4/2011 Jonsson .................... F21V 3/02
29/592.1
(Continued)

FOREIGN PATENT DOCUMENTS

CN 203215338 U * 9/2013 ........... F21K 9/1355
CN 217334009 U * 8/2022
KR 20120024013 A * 3/2012

OTHER PUBLICATIONS

Machine translation of CN 217334009 U retrieved from the FIT database of PE2E search. (Year: 2024).*
(Continued)

*Primary Examiner* — Colin J Cattanach
(74) *Attorney, Agent, or Firm* — Westbridge IP LLC

(57) ABSTRACT

A filament lamp includes a plastic housing, a transfer switch, and a laterally rotary structure. The transfer switch is disposed in the plastic housing, an outer wall of the plastic housing is provided with an opening, the laterally rotary structure is rotatably disposed on the outer wall of the plastic housing, an inner side, close to the plastic housing, of the laterally rotary structure extends to form a drive connecting structure, and the drive connecting structure passes through the opening to be connected with the transfer switch in a transmission way. With the design of the laterally rotary structure, when gears are adjusted by a user, the transfer switch is operated by the drive connecting structure only by rotating the laterally rotary structure on the outer wall of the plastic housing, so as to switch the gears.

6 Claims, 10 Drawing Sheets

(51) Int. Cl.

| | |
|---|---|
| ***F21K 9/232*** | (2016.01) |
| ***F21K 9/233*** | (2016.01) |
| ***F21K 9/235*** | (2016.01) |
| ***F21K 9/237*** | (2016.01) |
| ***F21K 9/238*** | (2016.01) |
| ***F21V 17/16*** | (2006.01) |
| ***F21V 23/00*** | (2015.01) |
| ***F21V 23/04*** | (2006.01) |
| ***H01R 33/955*** | (2006.01) |

(52) U.S. Cl.

CPC ............ *F21V 23/0428* (2013.01); *F21K 9/23* (2016.08); *F21K 9/232* (2016.08); *F21K 9/233* (2016.08); *F21K 9/235* (2016.08); *F21K 9/237* (2016.08); *F21K 9/238* (2016.08); *F21V 17/16* (2013.01); *F21V 17/164* (2013.01); *F21V 19/004* (2013.01); *F21V 19/0055* (2013.01); *F21V 19/006* (2013.01); *F21V 19/0065* (2013.01); *F21V 19/007* (2013.01); *F21V 23/04* (2013.01); *H01R 33/9555* (2013.01)

(56) References Cited

U.S. PATENT DOCUMENTS

2016/0161102 A1* 6/2016 Chou ........................ F21K 9/20
362/249.02
2021/0018147 A1* 1/2021 Liu ........................ F21K 9/237

OTHER PUBLICATIONS

Machine translation of CN 203215338 U retrieved from the FIT database of PE2E search. (Year: 2024).*
Machine translation of KR 20120024013 A retrieved from the FIT database of PE2E search. (Year: 2024).*

* cited by examiner

FILAMENT LAMP

TECHNICAL FIELD

The present disclosure relates to the field of lamp devices, and particularly relates to a filament lamp.

BACKGROUND

In the prior art, the common arrangement for a filament lamp is that a plastic housing part of the filament lamp is provided with an opening, while the opening is slidably provided with a sliding cover, and a driving assembly inside the filament lamp is controlled by moving the sliding cover so as to adjust gears of the filament lamp: taking Chinese Patent Publication CN210807729U titled “LED Filament Lamp Supporting Three-Section Switch Color Temperature Adjustment” as an example, as the sliding range of the sliding cover is limited by the size of the opening, a user must face one side of the sliding cover when performing gear adjustment, and at disposing positions of some lamps, the fixed sliding range of the sliding cover may be blocked and thus operation of the user is inconvenient: moreover, for the arrangement of sliding the sliding cover in the opening, a certain notch may exist in a circumferential surface of the plastic housing after the sliding cover slides, and in the case that the notch is blocked by foreign matter, the sliding cover may be difficult to slide and reset.

SUMMARY

The technical problem to be solved by the present disclosure is to provide a filament lamp which is convenient to adjust gears and meets the stroke requirements of multi-gear design.

In order to solve the technical problem above, the technical solution adopted by the present disclosure is as follows: a filament lamp includes a plastic housing, a transfer switch, and a lateral rotary structure. The transfer switch is disposed in the plastic housing, an outer wall of the plastic housing is provided with an opening, the lateral rotary structure is rotatably disposed on the outer wall of the plastic housing, an inner side, close to the plastic housing, of the lateral rotary structure extends to form a drive connecting structure, and the drive connecting structure passes through the opening to be connected with the transfer switch in a transmission way.

Further, the lateral rotary structure includes a rotary ring, the outer wall of the plastic housing is provided with a rotary groove, and the rotary ring is rotatably fitted within the rotary groove; and the transfer switch includes a movable stop lever for linearly toggling and switching gears of the filament lamp, the drive connecting structure includes a claw, and the claw is clamped with the movable stop lever.

Further, the lateral rotary structure includes a rotary knob, the transfer switch includes a movable stop lever for rotatably switching gears of the filament lamp, the drive connecting structure includes a rotary lever, one end of the rotary lever is sleeved on the movable stop lever, and the rotary knob is connected with the rotary lever.

Further, the plastic housing includes an upper housing and a lower housing, and the upper housing is buckled with the lower housing; and a lower end of the upper housing is abutted with an upper end of the lower housing to form the rotary groove.

Further, the upper housing extends towards the lower housing to form a first clamping ring, and the first clamping ring is provided with a plurality of clamping holes at intervals in a circumferential direction thereof; and the lower housing extends towards the upper housing to form a second clamping ring, and the second clamping ring is provided with a plurality of clamping hooks corresponding to the clamping holes at intervals in a circumferential direction thereof.

Further, the filament lamp further includes a circuit board. The transfer switch is disposed on the circuit board; and an inner wall of the first clamping ring is provided with first convex edges, and edges of the circuit board abut against the first convex edges.

Further, the inner wall of the first clamping ring is provided with at least two elastic clamping hooks, and second convex edges are portions of the elastic clamping hooks protruding from the inner wall of the first clamping ring; and the second clamping ring is provided with avoidance openings corresponding to the elastic clamping hooks.

Further, the first clamping ring is provided with a positioning insertion plate, and the second clamping ring is provided with a positioning insertion slot in insertion fitting with the positioning insertion plate corresponding to the positioning insertion plate.

Further, two sides of an opening of the positioning insertion slot are provided with guide inclined surfaces.

Further, the rotary ring is provided with anti-slip lines on an outer surface thereof.

The present disclosure has the following beneficial effects: by means of the design of the lateral rotary structure, when gears are adjusted by a user, the transfer switch is operated by the drive connecting structure only by rotating the lateral rotary structure on the outer wall of the plastic housing, so as to switch the gears: compared with a conventional mode of sliding switching, a stroke of rotary switching can meet the design requirements of multiple gears; and a sliding groove does not need to be designed for the rotary design, and a notch for the sliding switching does not exist, thereby preventing foreign matter from blocking the notch and affecting gear switching.

DETAILED DESCRIPTION OF THE EMBODIMENTS

Figure 1:
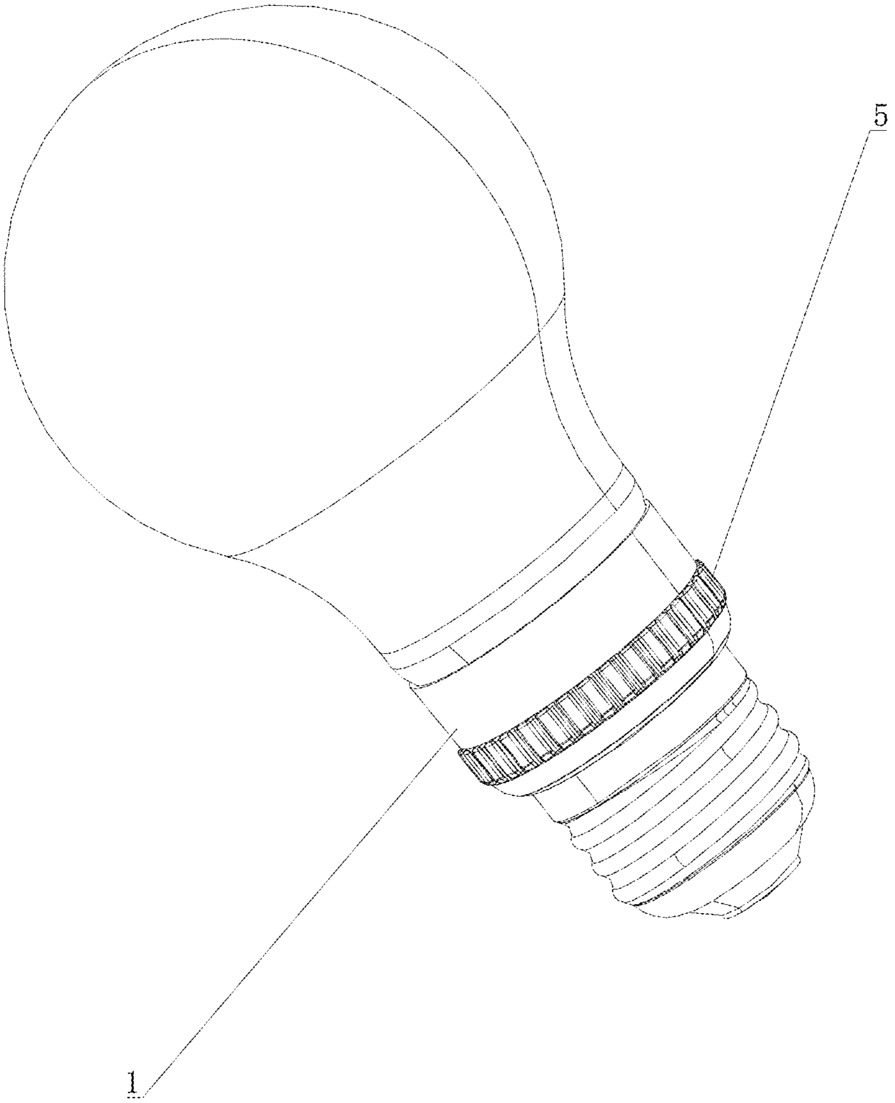
FIG. 1 is a schematic structural diagram of a filament lamp according to example 1 of the present disclosure.

In order to explain the technical contents, objects, and effects of the present disclosure in detail, the description will be made below in conjunction with embodiments and accompanying drawings.

With reference to FIG. 1 to FIG. 10, a filament lamp includes a plastic housing 1, a transfer switch 2, and a lateral rotary structure, where the transfer switch 2 is disposed in the plastic housing 1, an outer wall of the plastic housing 1 is provided with an opening, the lateral rotary structure is rotatably disposed on the outer wall of the plastic housing 1, an inner side, close to the plastic housing 1, of the lateral rotary structure extends to form a drive connecting structure, and the drive connecting structure passes through the opening to be connected with the transfer switch 2 in a transmission way.

It can be seen from the description above that the present disclosure has the following beneficial effects: by means of the design of the lateral rotary structure, when gears are adjusted by a user, the transfer switch 2 is operated by the drive connecting structure only by rotating the lateral rotary structure on the outer wall of the plastic housing 1, so as to switch the gears; compared with a conventional mode of sliding switching, a stroke of rotary switching can meet the design requirements of multiple gears; and a sliding groove does not need to be designed for the rotary design, and a notch for the sliding switching does not exist, thereby preventing foreign matter from blocking the notch and affecting gear switching.

Further, the lateral rotary structure includes a rotary ring 5, the outer wall of the plastic housing 1 is provided with a rotary groove 4, and the rotary ring 5 is rotatably fitted within the rotary groove 4; and the transfer switch 2 includes a movable stop lever 3 for linearly toggling and switching gears of the filament lamp, the drive connecting structure comprises a claw 6, and the claw 6 is clamped with the movable stop lever 3.

It can be seen from the description above that the rotation of the rotary ring 5 drives the claw 6 to move, while the movable stop lever 3 is clamped by the claw 6, and the movable stop lever 3 is simultaneously driven to move linearly with respect to the transfer switch 2, so as to achieve gear adjustment.

Further, the lateral rotary structure includes a rotary knob 22, the transfer switch 2 includes a movable stop lever 3 for rotatably switching gears of the filament lamp, the drive connecting structure includes a rotary lever 20, one end of the rotary lever 20 is sleeved on the movable stop lever 3, and the rotary knob 22 is connected with the rotary lever 20.

It can be seen from the description above that the rotary knob 22 can be adopted as another design of the lateral rotary structure, and the rotary lever 20 drives the movable stop lever 3 to rotate by rotating the rotary knob 22, so as to achieve gear adjustment.

Further, the plastic housing 1 includes an upper housing 7 and a lower housing 8, and the upper housing 7 is buckled with the lower housing 8; and a lower end of the upper housing 7 is abutted with an upper end of the lower housing 8 to form the rotary groove 4.

It can be seen from the description above that the assembly of the plastic housing 1 is quickly achieved by buckling the upper housing 7 with the lower housing 8; and before the upper housing 7 is buckled with the lower housing 8, the rotary ring 5 is sleeved on the upper end of the lower housing 8, and the lower end of the upper housing 7 is combined with the upper end of the lower housing 8, so as to limit the rotary ring 5.

Further, the upper housing 7 extends towards the lower housing 8 to form a first clamping ring 9, and the first clamping ring 9 is provided with a plurality of clamping holes 11 at intervals in a circumferential direction thereof; and the lower housing 8 extends towards the upper housing 7 to form a second clamping ring 10, and the second clamping ring 10 is provided with a plurality of clamping hooks 12 corresponding to the clamping holes 11 at intervals in a circumferential direction thereof.

It can be seen from the description above that by fitting the clamping holes 11 of the first clamping ring 9 with the clamping hooks 12 of the second clamping ring 10, the upper housing 7 is quickly buckled and fixed with the lower housing 8.

Further, the filament lamp further includes a circuit board 23, where the transfer switch 2 is disposed on the circuit board 23; and an inner wall of the first clamping ring 9 is provided with first convex edges, and edges of the circuit board 23 abut against the first convex edges.

It can be seen from the description above that the first convex edges of the inner wall of the first clamping ring 9 is abutted with and limit the edges of the circuit board 23, and the circuit board 23 is positioned at an installation position in the plastic housing 1, so as to facilitate subsequent gluing or locking and fixing.

Further, the inner wall of the first clamping ring 9 is provided with at least two elastic clamping hooks 13, and second convex edges are portions of the elastic clamping hooks 13 protruding from the inner wall of the first clamping ring 9; and the second clamping ring is provided with avoidance openings 14 corresponding to the clastic clamping hooks 13.

It can be seen from the description above that by means of the design of the elastic clamping hooks 13, certain pressure can be applied to the circuit board 23 in the circumferential direction of the plastic housing 1 while satisfying the condition of limiting the installation of the circuit board 23, so as to enhance the fixation of the circuit board 23; and the avoidance openings 14 formed in the second clamping ring are used for avoiding interference with the elastic clamping hooks 13.

Further, the first clamping ring 9 is provided with a positioning insertion plate 15, and the second clamping ring 10 is provided with a positioning insertion slot 16 in insertion fitting with the positioning insertion plate 15 corresponding to the positioning insertion plate 15.

It can be seen from the description above that the positioning when the first clamping ring 9 is buckled with the second clamping ring 10 is achieved by the fitting between the positioning insertion plate 15 of the first clamping ring 9 and the positioning insertion slot 16 of the second clamping ring 10.

Further, two sides of an opening of the positioning insertion slot 16 are provided with guide inclined surfaces.

It can be seen from the description above that by means of the design of the guide inclined surfaces, when the positioning insertion plate 15 is abutted with the positioning insertion slot 16, the positioning insertion plate 15 can be accurately inserted into the positioning insertion slot 16 by the guide of the guide inclined surfaces.

Further, the rotary ring 5 is provided with anti-slip lines on an outer surface thereof.

It can be seen from the description above that by means of the design of the anti-slip lines on the rotary ring 5, the anti-slip performance of the rotary ring 5 is improved, and the rotary operation of the user is facilitated.

Example 1

Application scenario: when it is necessary to switch gears of a filament lamp, as conventional modes of a sliding cover and an opening have a limited sliding range, when the sliding cover is blocked by an installation position of the filament lamp, it is inconvenient for a user to slide the sliding cover: moreover, for the arrangement of sliding the sliding cover in the opening, a certain notch may exist in a circumferential surface of the plastic housing 1 after the sliding cover slides, and in the case that the notch is blocked by foreign matter, the sliding cover may be difficult to slide and reset.

As shown in FIG. 1 to FIG. 5, the filament lamp of this example includes a bulb shell, a stem, the plastic housing 1, a circuit board 23, a transfer switch 2, a rotary ring 5, and a claw 6.

The bulb shell is disposed on an upper side of the plastic housing 1, the stem is disposed in the bulb shell, and the circuit board 23 is disposed in the plastic housing 1 and electrically connected with the stem. Specifically, a hard guide wire of the stem is connected and inserted on the circuit board 23 or a soft guide wire of the stem is welded or wound on the circuit board 23 to achieve the connection of the two. A light source on the stem may be integrated by a plurality of single filaments with a monochromatic temperature or integrated two-color temperature or multi-color temperature, and switching of different color temperatures is achieved by connecting the filaments in different series and parallel relationships.

Figure 5:
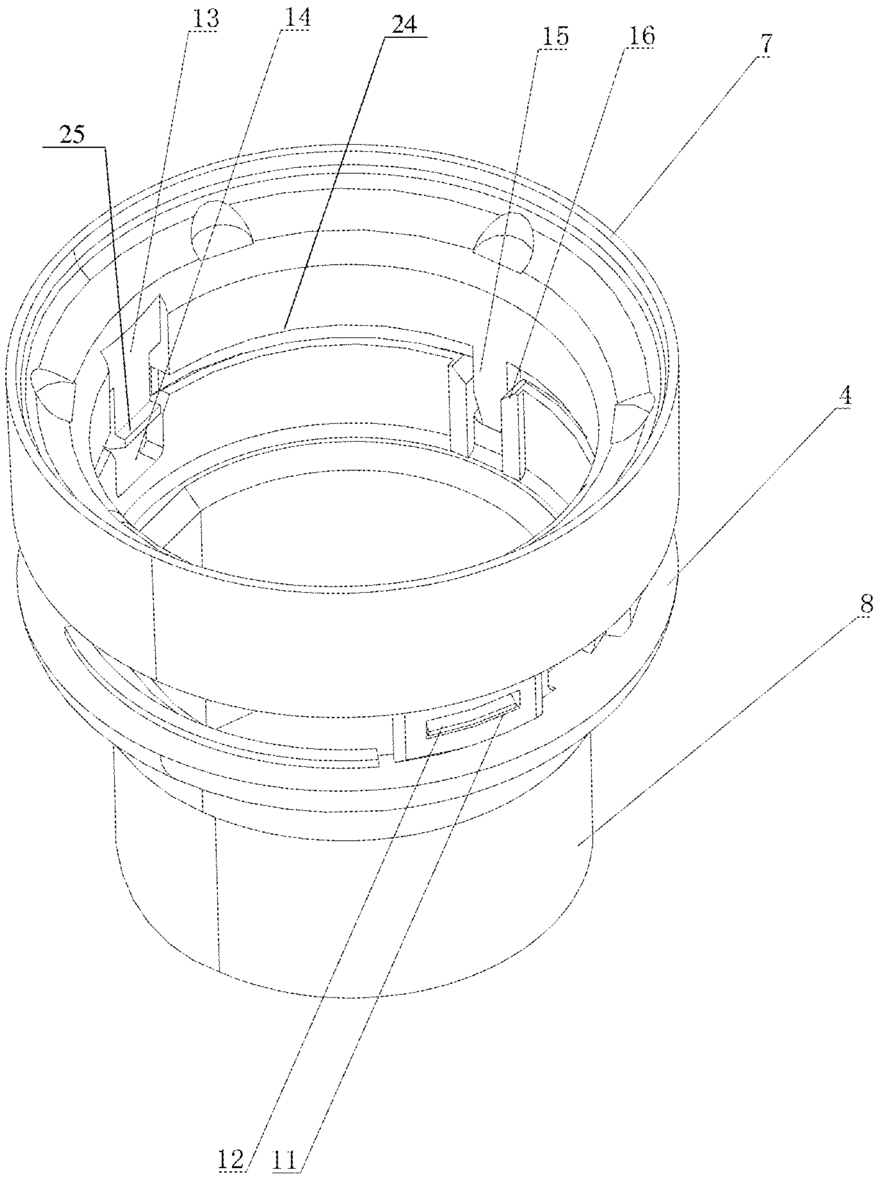
FIG. 5 is a schematic structural diagram of fitting between the upper housing and the lower housing of the filament lamp according to example 1 of the present disclosure.

As shown in FIG. 5, the plastic housing 1 includes an upper housing 7 and a lower housing 8, and the upper housing 7 is buckled with the lower housing 8; and a lower end of the upper housing 7 is abutted with an upper end of the lower housing 8 to form a rotary groove 4.

Figure 4:
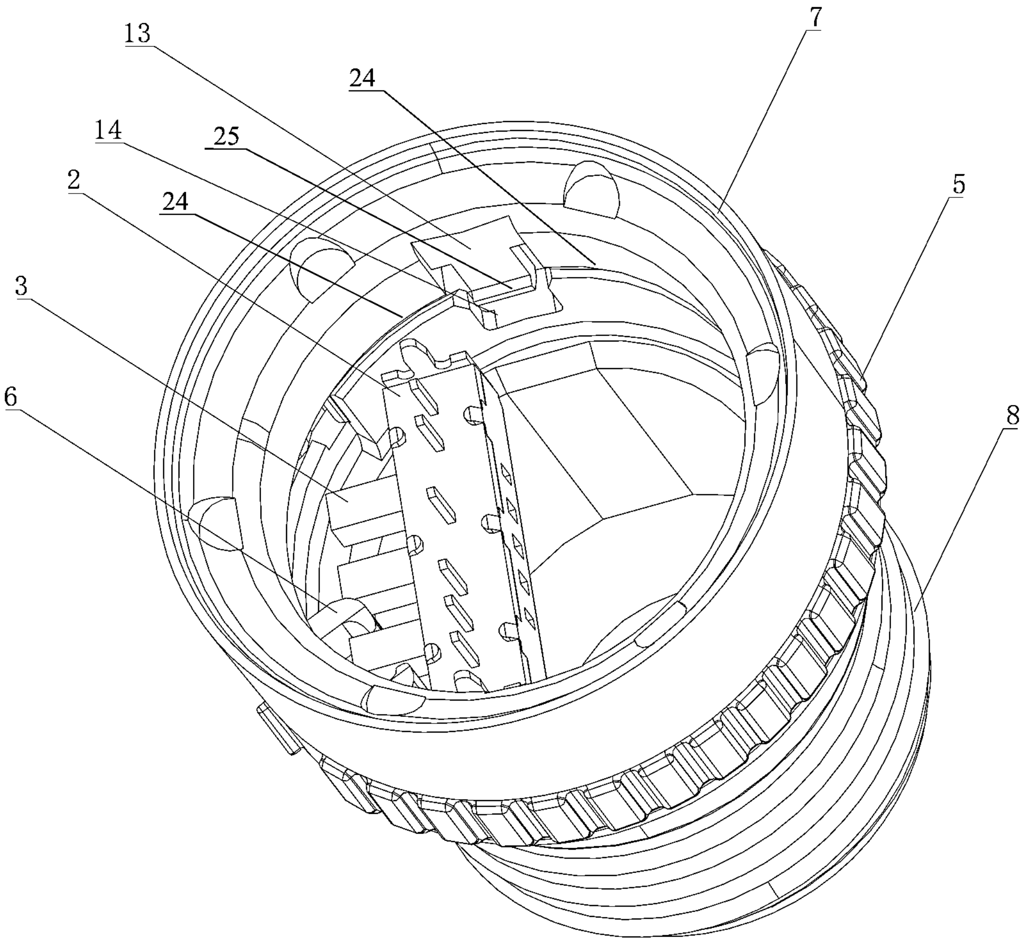
FIG. 4 is a schematic structural diagram of fitting among a transfer switch, a rotary ring, an upper housing, and a lower housing of the filament lamp according to example 1 of the present disclosure.

As shown in FIG. 4, the transfer switch 2 is provided with a movable stop lever 3 for linearly toggling and switching gears of the filament lamp. The rotary ring 5 is rotatably fitted within the rotary groove 4, and the rotary ring 5 is provided with anti-slip lines; and the claw 6 is clamped with the movable stop lever 3.

Figure 2:
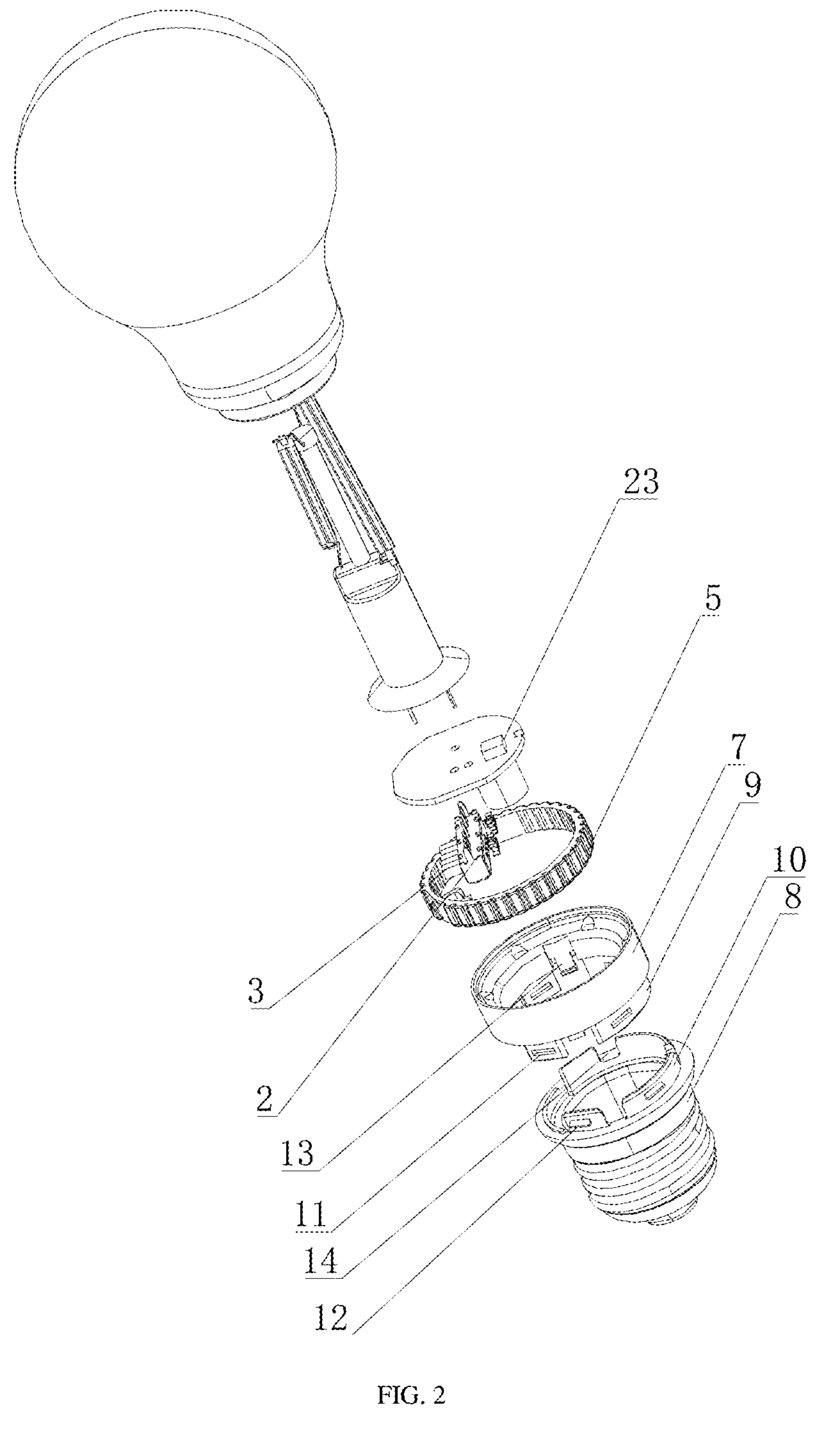
FIG. 2 is an exploded diagram of the filament lamp according to example 1 of the present disclosure.

As shown in FIG. 2 and FIG. 5, the upper housing 7 extends towards the lower housing 8 to form a first clamping ring 9, and the first clamping ring 9 is provided with a plurality of clamping holes 11 at intervals in a circumferential direction thereof; and the lower housing 8 extends towards the upper housing 7 to form a second clamping ring 10, and the second clamping ring 10 is provided with a plurality of clamping hooks 12 corresponding to the clamping holes 11 at intervals in a circumferential direction thereof.

Figure 3:
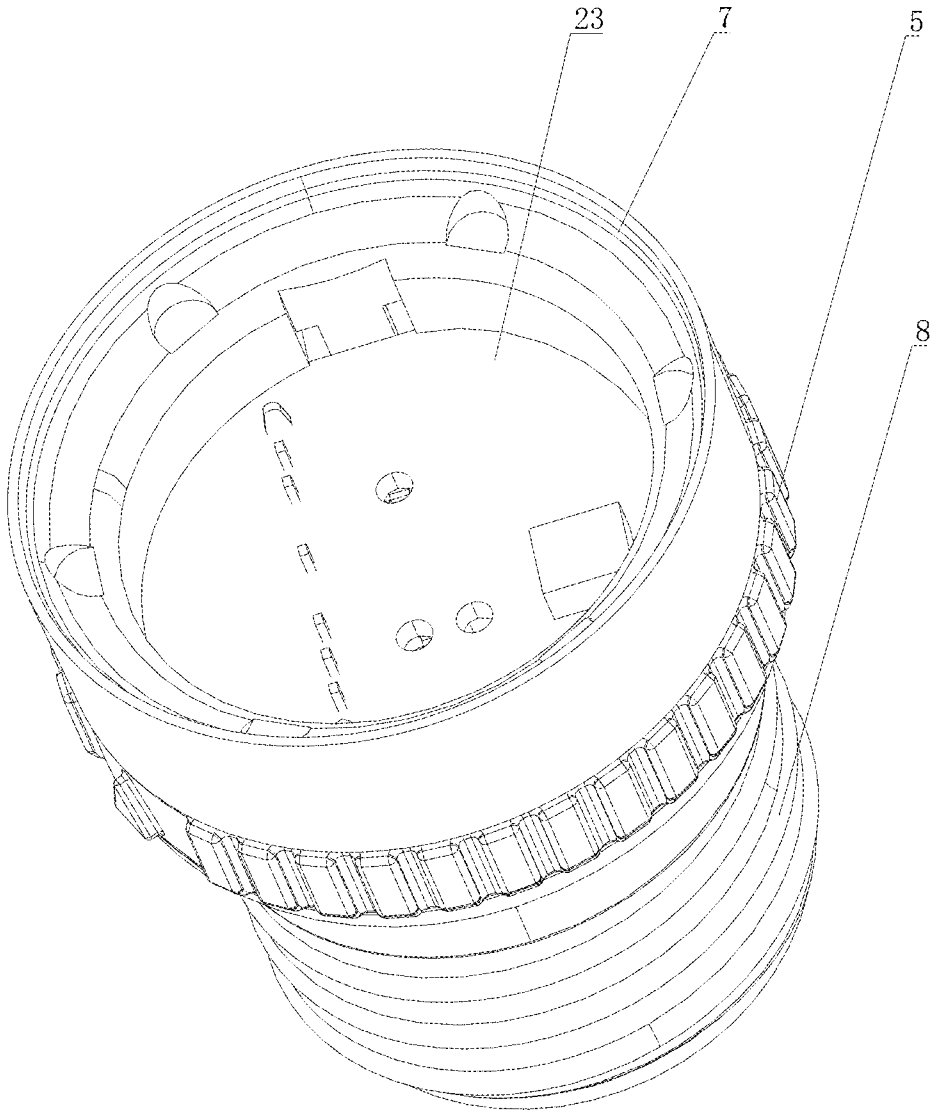
FIG. 3 is a schematic structural diagram of fitting between a circuit board and a plastic housing of the filament lamp according to example 1 of the present disclosure.

As shown in FIG. 3 and FIG. 4, the transfer switch 2 is disposed on the circuit board 23; and an inner wall of the first clamping ring 9 is provided with first convex edges, and edges of the circuit board 23 abut against the first convex edges. Specifically, the inner wall of the first clamping ring 9 is provided with at least two elastic clamping hooks 13, and second convex edges are portions of the elastic clamping hooks 13 protruding from the inner wall of the first clamping ring 9; and the second clamping ring is provided with avoidance openings 14 corresponding to the elastic clamping hooks 13.

As shown in FIG. 5, the first clamping ring 9 is provided with a positioning insertion plate 15, and the second clamping ring 10 is provided with a positioning insertion slot 16 in insertion fitting with the positioning insertion plate 15 corresponding to the positioning insertion plate 15. Two sides of an opening of the positioning insertion slot 16 are provided with guide inclined surfaces.

Working principle: when gear adjustment is needed, by rotating the rotary ring 5 on an outer ring of the plastic housing 1, due to the annular arrangement of the rotary ring 5, the rotary ring 5 is not limited by the installation position of the lamp and the rotation of the rotary ring 5 is convenient, and the rotary adjustment can be achieved at any annular position of the plastic housing 1.

The distribution of an internal space of the plastic housing 1 can be performed by adopting a toggle switch or a rotary switch respectively according to the requirements of an internal installation assembly.

With regard to the assembly of the plastic housing 1, quick installation can be achieved by buckling the clamping holes 11 in the lower end of the upper housing 7 with the clamping hooks 12 at the upper end of the lower housing 8.

Example 2

As shown in FIG. 6 to FIG. 10, a filament lamp of this example includes a bulb shell, a stem, a plastic housing 1, a circuit board 23, a transfer switch 2, a rotary lever 20 and a rotary knob.

Figure 6:
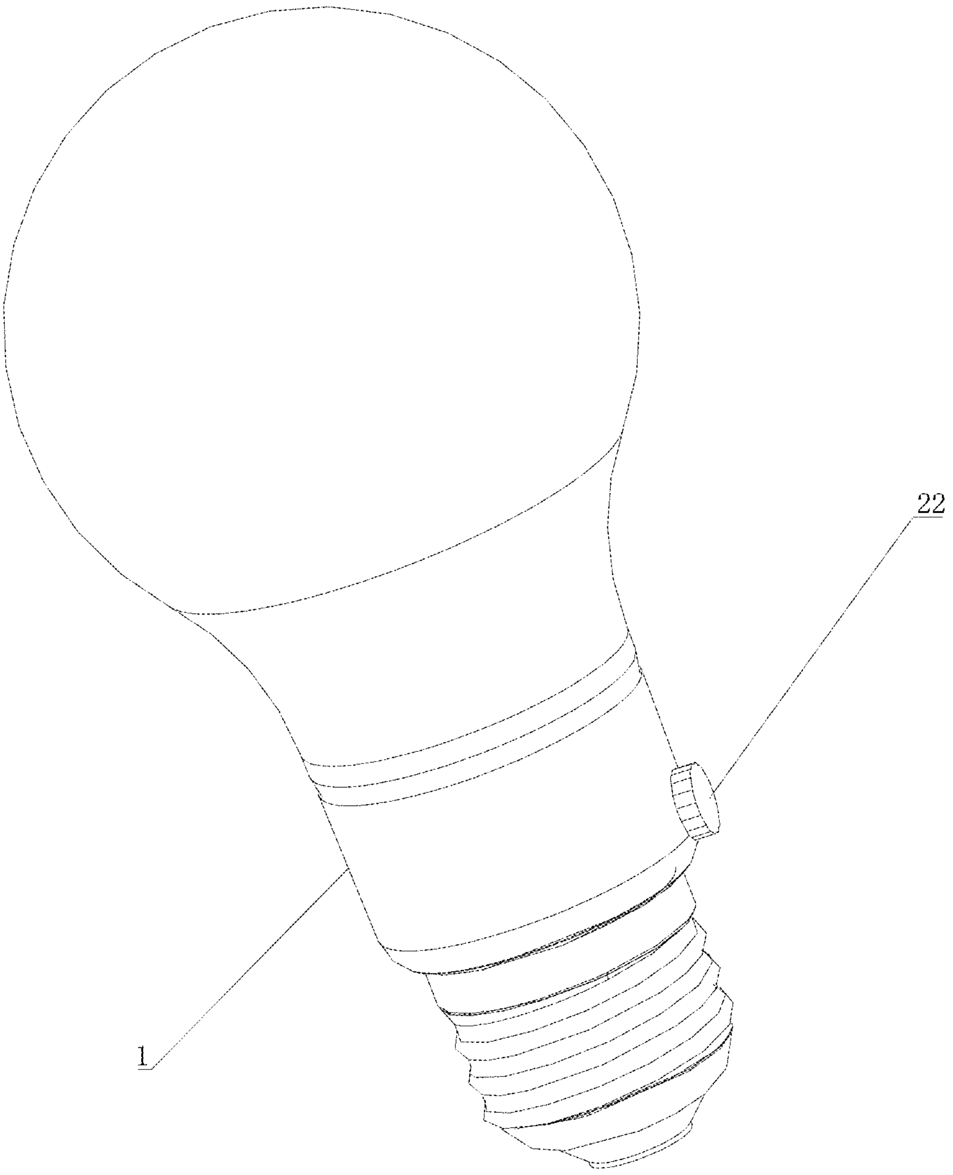
FIG. 6 is a schematic structural diagram of a filament lamp according to example 2 of the present disclosure.
Figure 7:
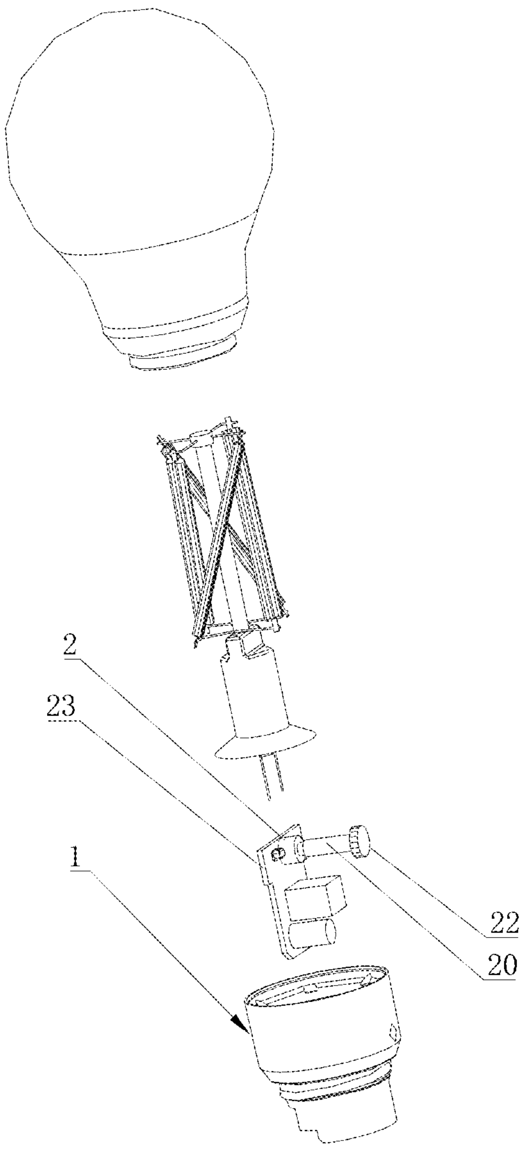
FIG. 7 is an exploded diagram of the filament lamp according to example 2 of the present disclosure.

As shown in FIG. 6 and FIG. 7, the bulb shell is disposed on an upper side of the plastic housing 1, the stem is disposed in the bulb shell, and the circuit board 23 is disposed in the plastic housing 1 and electrically connected with the stem. Specifically, a hard guide wire of the stem is connected and inserted on the circuit board 23 or a soft guide wire of the stem is welded or wound on the circuit board 23 to achieve the connection of the two. A light source on the stem may be integrated by a plurality of single filaments with a monochromatic temperature or integrated two-color temperature or multi-color temperature, and switching of different color temperatures is achieved by connecting the filaments in different series and parallel relationships.

Figure 8:
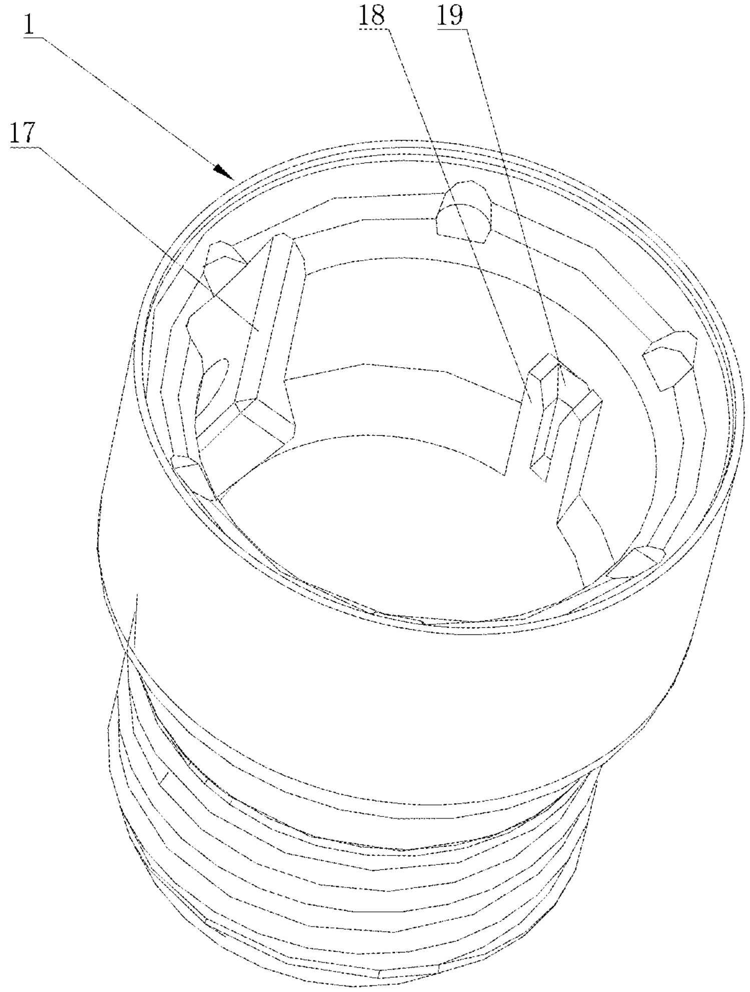
FIG. 8 is a schematic structural diagram of a plastic housing of the filament lamp according to example 2 of the present disclosure.
Figure 9:
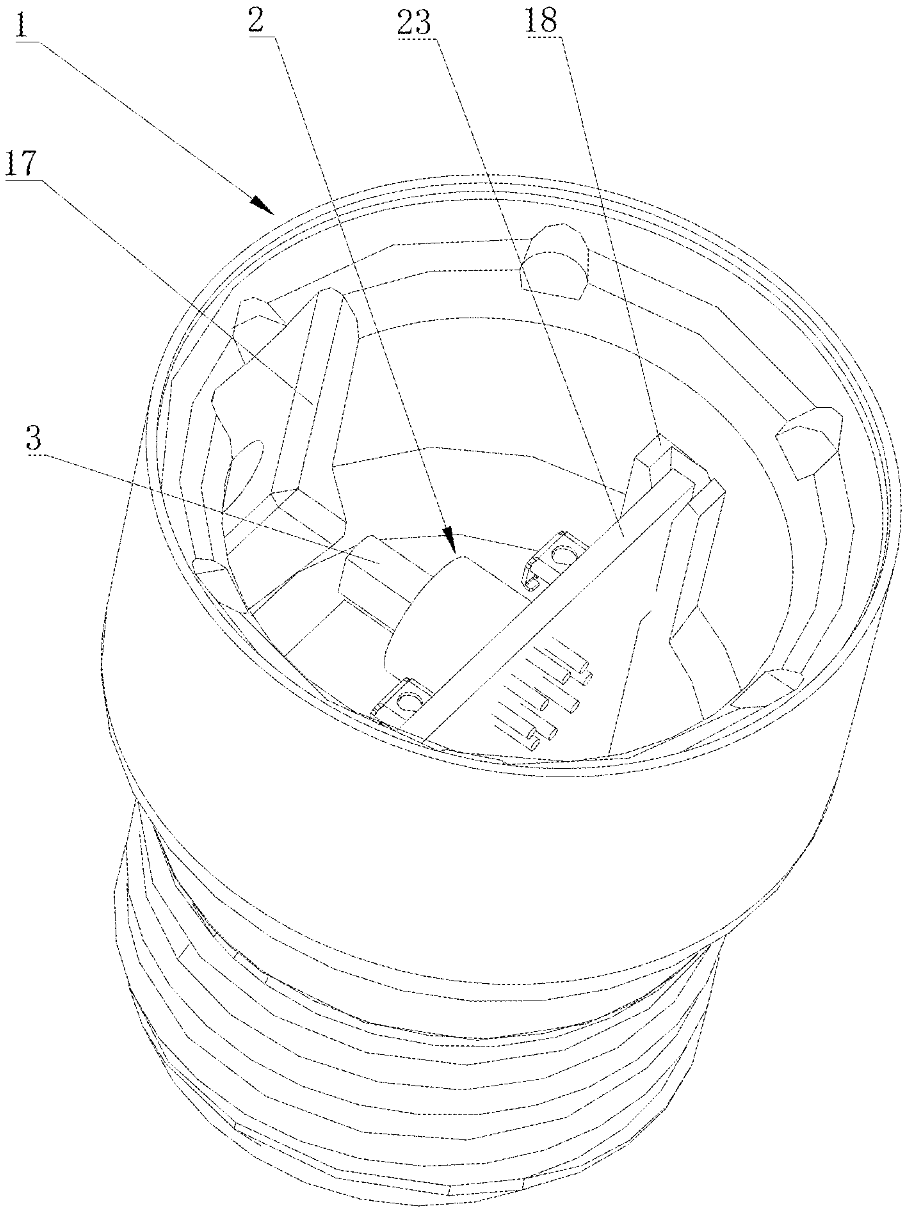
FIG. 9 is a schematic diagram of fitting between the plastic housing and a circuit board of the filament lamp according to example 2 of the present disclosure.

As shown in FIG. 8 and FIG. 9, an inner wall of the plastic housing 1 is provided with a bayonet socket 18 corresponding to the circuit board 23, the bayonet socket 18 is provided with a socket 19, the socket 19 is in the shape of a trumpet, and two sides of the socket 19 are provided with inclined surfaces; and the circuit board 23 is inserted into the bayonet socket 18 and a board surface of the circuit board 23 is opposite to the inner wall of the plastic housing 1. The transfer switch 2 is disposed on the circuit board 23, and the transfer switch 2 is provided with a movable stop lever 3 for rotatably switching gears of the filament lamp. In this example, the transfer switch 2 is used for color temperature switching.

An outer wall of the plastic housing 1 is provided with an opening as a rotary hole, the rotary lever 20 passes through the rotary hole to be detachably connected with the transfer switch 2 in the plastic housing 1, and specifically, one end of the rotary lever 20 is sleeved on the movable stop lever 3. When the rotary lever 20 rotates, the movable stop lever 3 is driven to rotate, so as to switch functions of the transfer switch 2.

The rotary knob 22 is disposed on the outer wall of the plastic housing 1 and connected with the rotary lever 20. Optionally, the rotary knob 22 is detachably connected with the rotary lever 20, so as to achieve quick replacement of the rotary knob 22. The rotary knob 22 is provided with an anti-slip convex design in a circumferential direction.

Figure 10:
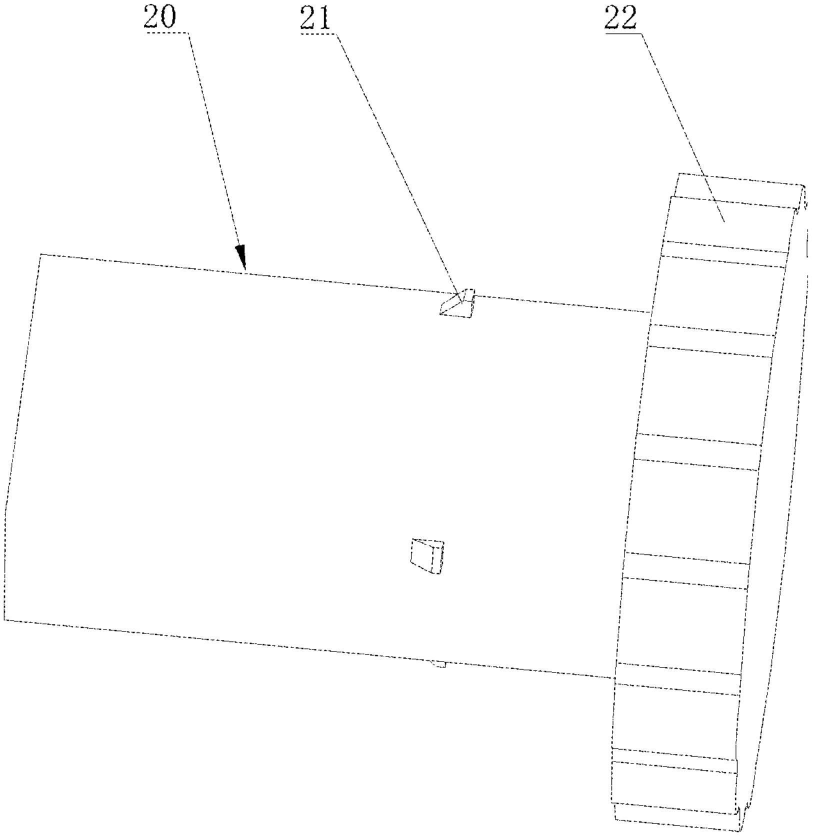
FIG. 10 is a schematic structural diagram of a rotary lever and a rotary knob of the filament lamp according to example 2 of the present disclosure.

As shown in FIG. 9 and FIG. 10, the inner wall of the plastic housing 1 is partially recessed towards an outer side of the plastic housing 1 corresponding to the rotary hole, and the inner wall of the plastic housing 1 corresponding to a formed recessed portion 17 is planar; and the rotary lever 20 is provided with a limiting clamping block 21 in a circumferential direction thereof, and the limiting clamping block 21 abuts against an edge of the rotary hole in the inner wall of the plastic housing 1, namely abuts against the plane of the recessed portion 17. The limiting clamping block 21 is provided with a guide inclined surface, and the guide inclined surface faces the transfer switch 2.

In summary, for the filament lamp provided by the present disclosure, by means of the design of the lateral rotary structure, when gears are adjusted by a user, the transfer switch is operated by the drive connecting structure only by rotating the lateral rotary structure on the outer wall of the plastic housing, so as to switch the gears; compared with a conventional mode of sliding switching, a stroke of rotary switching can meet the design requirements of multiple gears; and a sliding groove does not need to be designed for the rotary design, and a notch for the sliding switching does not exist, thereby preventing foreign matter from blocking the notch and affecting gear switching.

The foregoing is only directed to examples of the present disclosure, and does not therefore limit the patent scope of the present disclosure. All equivalent transformations made by using the contents of the description and accompanying drawings of the present disclosure, or directly or indirectly applied in the relevant technical fields, are similarly included in the patent protection scope of the present disclosure.

What is claimed is:

1. A filament lamp, comprising a plastic housing, a transfer switch, and a lateral rotary structure, wherein the transfer switch is disposed in the plastic housing, an outer wall of the plastic housing is provided with an opening, the lateral rotary structure is rotatably disposed on the outer wall of the plastic housing, an inner side of the lateral rotary structure extends to form a drive connecting structure, and the drive connecting structure passes through the opening to be connected with the transfer switch; the transfer switch comprises a movable stop lever for linearly toggling and switching gears of the filament lamp, the drive connecting structure comprises a claw, and the claw is clamped with the movable stop lever; the plastic housing comprises an upper housing and a lower housing, the upper housing forms a first clamping ring, the lower housing forms a second clamping ring, and the upper housing is buckled with the lower housing; the transfer switch is disposed on a circuit board; an inner wall of the first clamping ring is provided with first convex edges, and upper edges of the circuit board abut against the first convex edges; the inner wall of the first clamping ring is provided with at least two elastic clamping hooks, each of the at least two elastic clamping hooks comprise a second convex edge that protrudes inward at one end toward an axial center of the upper housing, the circuit board is positioned in a gap between the first convex edges and the second convex edges; and the second clamping ring is provided with avoidance openings corresponding to the elastic clamping hooks.

2. The filament lamp according to claim 1, wherein the lateral rotary structure comprises a rotary ring, the outer wall of the plastic housing is provided with a rotary groove, a lower end of the upper housing is abutted with an upper end of the lower housing to form the rotary groove, and the rotary ring is rotatably fitted within the rotary groove.

3. The filament lamp according to claim 2, wherein the first clamping ring is provided with a plurality of first clamping holes at intervals in a circumferential direction thereof; and the second clamping ring is provided with a plurality of first clamping hooks corresponding to the first clamping holes at intervals in a circumferential direction thereof.

4. The filament lamp according to claim 3, wherein the first clamping ring is provided with a positioning insertion plate, and the second clamping ring is provided with a positioning insertion slot in insertion fitting with the positioning insertion plate.

5. The filament lamp according to claim 4, wherein two sides of an opening of the positioning insertion slot are provided with guide inclined surfaces.

6. The filament lamp according to claim 2, wherein the rotary ring is provided with anti-slip lines on an outer surface thereof.

* * * * *